United States Patent
Jaggers

Patent Number: 5,199,725
Date of Patent: Apr. 6, 1993

[54] ADJUSTABLE TOP JAW

[76] Inventor: James R. Jaggers, 3532 SW. 14 St., Fort Lauderdale, Fla. 33311

[21] Appl. No.: 637,692

[22] Filed: Jan. 7, 1991

[51] Int. Cl.[5] .............................................. B23B 31/16
[52] U.S. Cl. ................................................. 279/123
[58] Field of Search .................. 279/123, 15 J, 111, 279/112, 113

[56] References Cited

U.S. PATENT DOCUMENTS

| | | | |
|---|---|---|---|
| 295,230 | 3/1884 | Colton | 279/113 |
| 435,405 | 9/1890 | Cushman | 279/123 |
| 1,033,547 | 7/1912 | Cornil | 279/123 X |
| 1,454,148 | 5/1923 | Bisset | 279/123 |
| 4,431,201 | 2/1984 | Morisaki | 279/110 X |

FOREIGN PATENT DOCUMENTS

2311622 12/1976 France ................. 279/123

Primary Examiner—Larry I. Schwartz
Assistant Examiner—Robert Schultz

[57] ABSTRACT

An adjustable top jaw is provided which is attachable to a master jaw which is in turn attached to a chuck of a lathe or similar machine. The top jaw comprises a base segment, top segment drive block and a lead screw. The base segment is mountable on the master jaw. A lead screw aperture extends entirely through the base segment. A drive block slot extends downward from the top of the base segment into the base segment a distance below the lead screw aperture. The drive block is located within the drive block slot and has a first aperture extending therethrough colinearly with the lead screw aperture. The lead screw is located within the lead screw aperture and drive block aperture. The top segment is attachable to the base segment and has a drive block channel for receiving a part of the drive block. The rotation of the lead screw causes the drive block to move forward or backward thus moving the top segment forward or backward in accordance with the movement of the drive block.

16 Claims, 4 Drawing Sheets

ADJUSTABLE TOP JAW

BACKGROUND OF THE INVENTION

1. Field of the Invention

This device relates to an adjustable top jaw and more particularly to an adjustable top jaw attached to a master jaw which is in turn attached to the chuck of a lathe or similar machine which top jaw is adjustable along a radial from the center of the chuck of such lath and which top jaw produces a clamping force along such radial.

2. Description of Related Art

Figure 4:
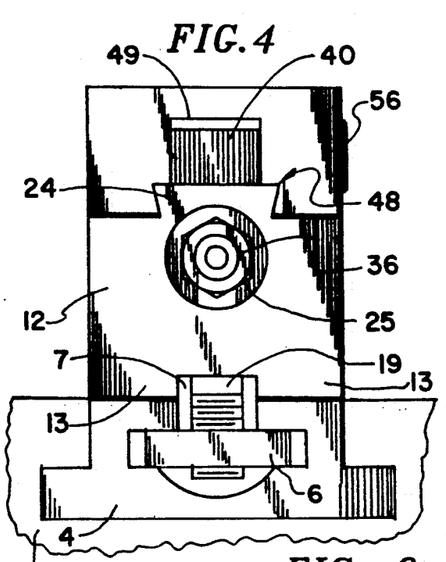
FIG. 4 is a rear elevational view of the invention of FIG. 1 in position on a master jaw attached to a chuck.
Figure 4A:
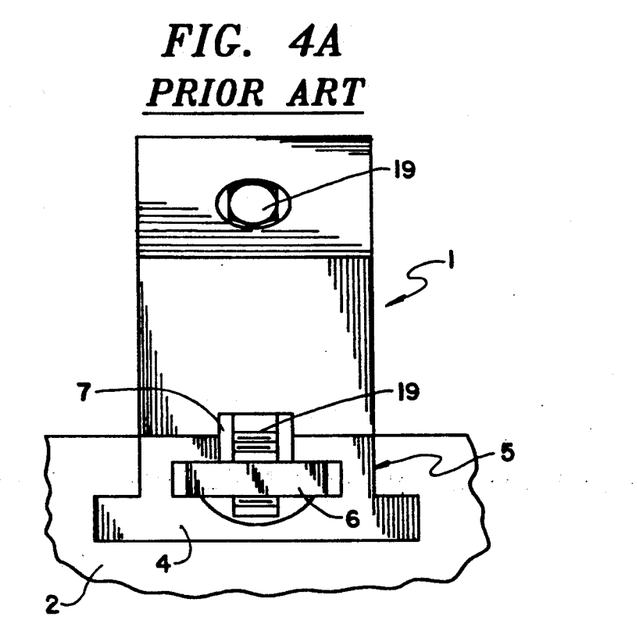
FIG. 4A is a rear elevational view of a prior art top jaw in position on a master jaw attached to a chuck.

Chucks, attached to lathes or similar devices, having a plurality of top jaws are currently available for holding work pieces in position on the chucks. FIG. 4A shows a typical prior art top jaw 1 located above a chuck 2. Typically, these prior art devices have a master jaw 1 recessed into a groove 5 located along radials extending outward from the center of the chuck 2. A one piece top jaw 1 is positionable above each master jaw 4 by moving the top jaw 1 to a desired position above the master jaw 4 and tightening a mounting screw 19 which extends through the top jaw 1 into a nut 6 restrained within a channel 7 in the master jaw 4. In this way, the top jaw 1 is held in the position it was set in above the master jaw 4 at the time the mounting screw 19 is tightened.

Typically, three such master and top jaw combinations exist on radials extending away from the center of the chuck. In this configuration, the master and top jaw combinations encircle an area approximately colineal with the axis of rotation of the chuck. However, once the prior art top jaws have been securely mounted above the master jaws, they are not capable of further movement along the radials extending from the center of the chuck. Therefore, they cannot provide a clamping force on a work piece located in the center of the convergence of the master and top jaw combinations. For this reason, a collet is placed in this convergence area between the top jaws to hold the work piece. When pressure is applied to the work piece at the end opposite the collet, the work piece is driven into the collet which because of its flared design wedges itself into the top jaws thereby putting clamping pressure on the work piece.

Although the use of collets allows the work piece to be clamped when pressure is applied to the work piece from the opposite end of the work piece, it is difficult for such collets to hold non-concentric work pieces. By non-concentric, it is meant that the part of the work piece held by the top jaws is not concentric with the part of the work piece to be acted on as the work piece is rotated by the chuck. In particular, once a non-concentric work piece is mounted in a collet, it is very difficult to adjust the top jaws to align the work piece section that will be worked with the axis of rotation of the chuck. This difficulty is largely the result of the lack of easy adjustment and particularly the lack of fine adjustment of the individual top jaws once the top jaws have been bolted to the master jaw. This is a problem in want of a solution.

Also, it is sometimes desirable to hold a work piece directly, instead of placing the work piece within a collet. The prior art devices do not allow for the work piece itself to be clamped by such top jaws without the use of collets. This is also a problem in want of a solution.

SUMMARY OF THE INVENTION

An adjustable top jaw is provided, attached to the chuck of a lathe or similar device, where the top jaw is adjustable along a radial extending from the center of the chuck to provide clamping action on a work piece. The top jaws are attached to the chuck through master jaws which are positioned along radials extending outward from the center of the chuck. The top jaw has a base segment which is securely fastened to the master jaw and a top segment which moves adjustably along the base segment in line with the radials of the chuck. The top segment is attached to the base segment by a mating connection with the base segment which connection aligns and constrains the movement of the top segment relative to the base segment.

The top segment is moved relative to the base segment by the rotation of a threaded lead screw which extends through the base segment along the radial from the chuck. The threaded lead screw passes through a correspondingly threaded aperture in a drive block located in a drive block slot in the base segment. Rotation of the threaded lead screw causes the drive block to move forward and backward in the drive lock slot. The drive block extends upward above the base segment into a recessed channel in the top segment. A drive pin extends through the top segment and through the drive block thereby connecting the top segment to the drive block and consequently to the base segment through the lead screw.

Opposite ends of the top segment itself may be specially configured to hold particular work pieces. Alternatively, attachments for holding particular work pieces may be attached to the top segment particularly at the ends. In either case, a single top segment may provide a variety of work piece holders, either by its intrinsic design or by attachment of the particular work piece holders. In addition, several top segments, individually configured to specific work piece holding configurations, may be provided to interact with a single base segment to provide a variety of work piece holders which may easily be attached to the base segment. This versatility in the availability of various work piece holders allows users of the new top jaw to quickly and easily adapt the top jaw to a variety of uses without having to re-attach new base segments or spend a large amount of time precisely aligning the top segments.

When a plurality of top jaws are attached along radials from the center of the chuck, the rotation of the respective lead screws causes the top segments to move forward and backward along the radials extending from the center of the chuck thereby clamping the work piece between the top segments. This is particularly useful in holding work pieces which are non-concentric. In addition, the adjustability of the top segments allows for easy and precise centering of these non-concentric work pieces. This is accomplished by adjusting the top segments by rotating the respective lead screws until the work piece is centered along the axis of rotation of the chuck. This feature has been heretofore unavailable on prior art work pieces.

It is therefore an object of the instant invention to provide a top jaw which is adjustable along the radials which extend away from the center of the chuck.

It is a further object of the instant invention to provide a top jaw which has a clamping ability.

It is another object of the instant invention to provide a top jaws which may be configured to hold particularly shaped work pieces.

It is a further object of the instant invention to provide a top jaw which allows the particularly configured work piece holding surfaces to be easily and readily changed.

It is another object of the instant invention to perform all the functions current top jaws, particularly holding collets.

It is another object of the instant invention to provide top jaws which can be finely adjusted to allow for precise positioning of work pieces.

Finally, it is an object of the instant invention to provide an adjustable top jaw which is relatively easy and inexpensive to manufacture.

Having thus briefly described the instant invention, the invention will now be described in detail with particular reference to the accompanying drawings where like elements are referred to by like numerals.

DETAILED DESCRIPTION OF THE INVENTION

Figure 7:
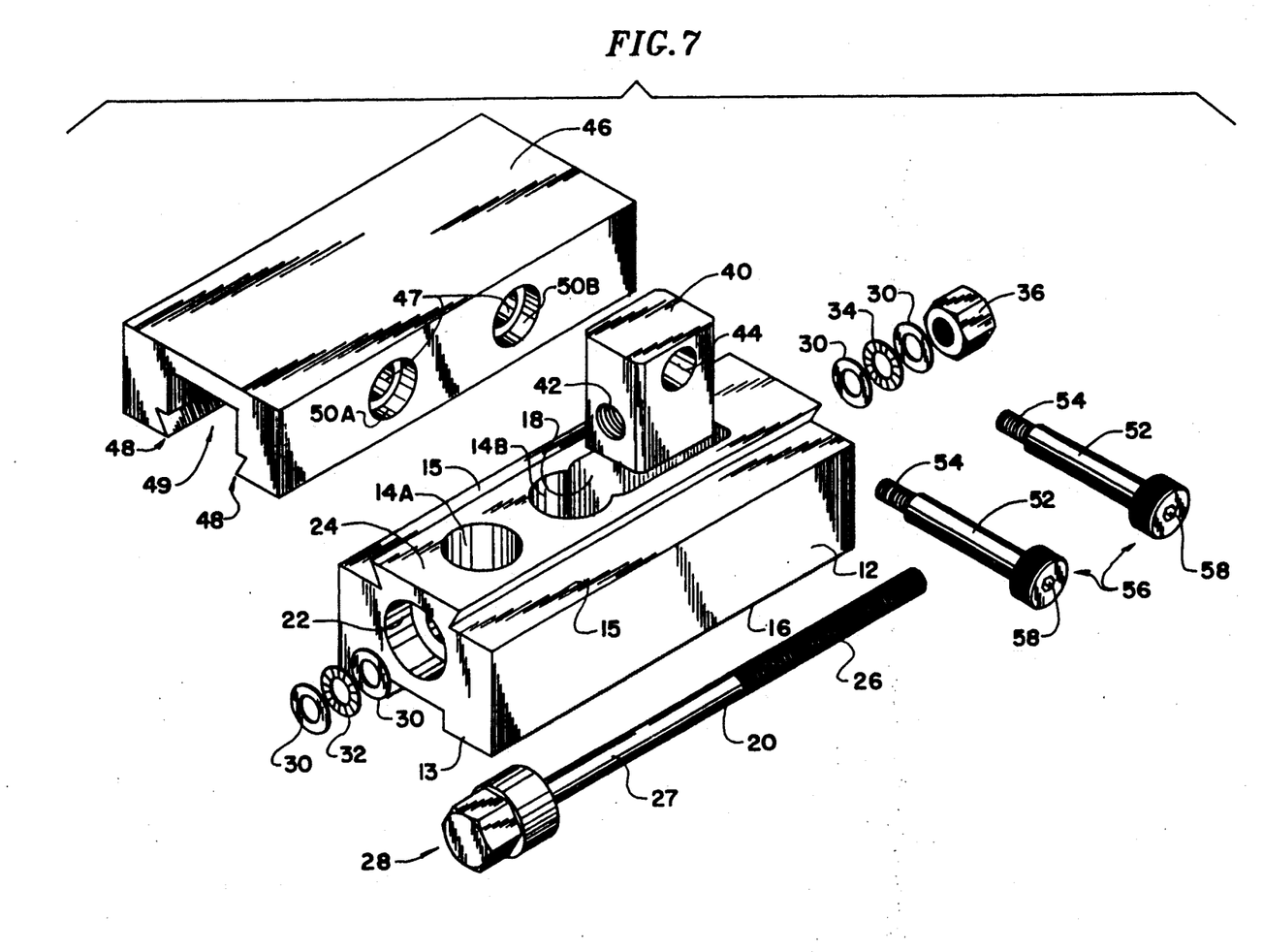
FIG. 7 is a top perspective exploded view of the invention of FIG. 1.

As best shown in FIG. 7, a top jaw 10 is provided which is generally labelled 10. Top jaw 10 is mounted on master jaw 4 which is recessed into a groove 5 in chuck 2 of a lathe or similar device (FIG. 4). The groove 5 positions master jaw 4 on chuck 2 and prevents side to side movement of master jaw 4 on chuck 2.

Figure 3:
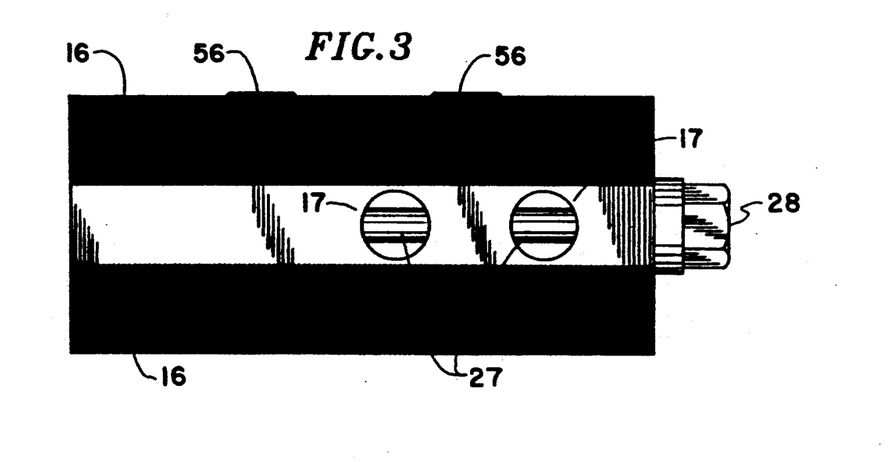
FIG. 3 is a bottom view of the invention of FIG. 1.
Figure 6:
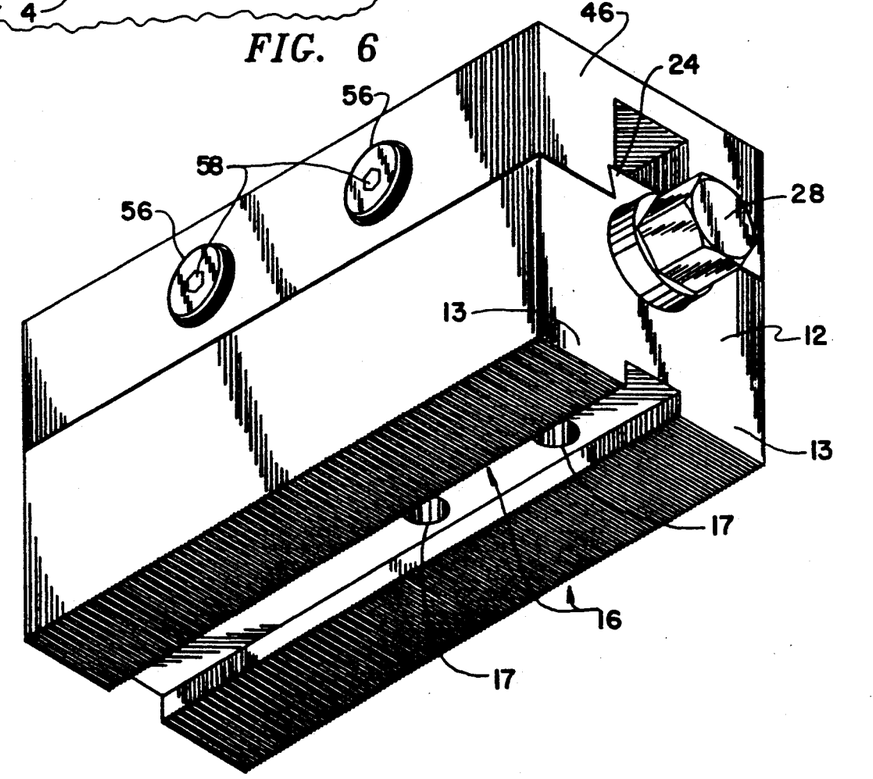
FIG. 6 is a bottom perspective view of the invention of FIG. 1.

Base segment 12 is attached to master jaw 4. Base segment 12 is generally rectangular in shape having a series of serrations 16 along its bottom side as shown in FIGS. 3 and 6. These serrations 16 comprise essentially right-triangular protrusions arranged in parallel along the bottom of the base segment 12 and extending across the downwardly extending legs 13 of base segment 12. Serrations 16 correspond in size and shape to right-triangular serrations (not shown) on the master jaw 4 to which the base segment 12 is mounted. The serrations of the master jaw 4 extend into the corresponding triangular shaped spaces between the serrations 16 of base segment 12, thereby preventing base segment 12 from moving forward or backward in a direction perpendicular to serrations 16.

Mounting apertures 14a,b are centered along the radial axis of base segment 12 and extend through base segment 12 from the top. These mounting apertures 14a,b have a reduced diameter 17 at the bottom of base segment 12 (FIG. 3). This permits mounting screws 19 to extend downward through mounting apertures 14a,b through base segment 12. But, because of the reduced diameter 17 of mounting apertures 14a,b, the heads of the mounting screws 19 are restrained from passing out of the bottom of base segment 12 by their interaction with reduced diameter 17.

When base segment 12 is placed upon master jaw 4 (FIGS. 4 and 8), the serrations 16 of base segment 12 are brought into contact with the serrations of master jaw 4, thereby positioning base segment 12 on master jaw 4 within the tolerance of the spacing between the serrations 16. The mounting screws 19 are then passed through mounting apertures 14a,b where they are threaded into nuts 6 constrained within channels 7 within master jaw 4. Turning these mounting screws brings them into physical contact with the reduced apertures 17 of mounting apertures 14a,b thereby securely fastening base segment 12 to master jaw 4.

Reduced apertures 17 of mounting apertures 14a,b are placed near the bottom of base segment 12 so that when mounting screws 19 are threaded into nuts 6 and tightened, thereby bringing base segment 12 into secure contact with master jaw 4, the heads of the mounting screws 19 are below a lead screw aperture 22 (FIG. 7) extending longitudinally entirely through base segment 12.

Figure 5:
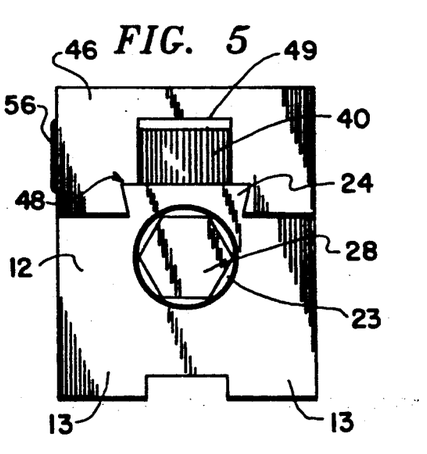
FIG. 5 is a front elevational view of the invention of FIG. 1.

Lead screw aperture 22 extends entirely through base segment 12 from the rear to the front of base segment 12 through mounting apertures 14a, b and through a drive block slot 18. Lead screw aperture 22 has enlarged apertures 23, 25 at the front and rear ends respectively of base segment 12 (FIGS. 4 and 5).

Drive block slot 18 extends downward from the top of base segment 12 into base segment 12. Drive block slot 18 is a rectangular elongated slot having its elongated axis colineal with the radial axis of base segment 12. In the preferred embodiment, mounting aperture 14b and drive block slot 18 overlap so that the overlapping sections of each is removed. Although this is the preferred embodiment, it is not necessary for the operation of this invention that this particular configuration be maintained. Drive block slot 18 extends downward from the top of base segment 12 to a distance below lead screw aperture 22 for a purpose which will be described hereafter.

A drive block 40 having a width approximately equal to drive block slot 18 but having a length less than the length of drive block slot 18 is seated within drive block slot 18. When drive block 40 is placed in drive block slot 18, drive block 40 rests on the bottom of drive block slot 18. A threaded drive block aperture 42 extends entirely through the longitudinal axis of drive block 40 so that when drive block 40 rests on the bottom of drive block slot 18, threaded drive block aperture 42 is aligned with lead screw aperture 22. A smooth drive block aperture 44 is located above threaded drive block 42. This smooth drive block aperture 44 extends through the width of drive block 40 perpendicular to threaded drive block aperture 42.

A lead screw 20 extends through lead screw aperture 22. Lead screw 20 has threads 26 along one end and a lead screw head 28, which is preferably a hexagonal head, at the other. Between the threads 26 and lead head screw 28 is a smooth bore 27. When lead screw 20 is in position within lead screw aperture 22, threads 26 extend in threading engagement through the threaded drive block aperture 42 of drive block 40.

A front bearing 32, spaced between two washers 30, is placed along smooth bore 27 of lead screw 20 between lead screw head 28 and expanded front aperture 23. Lead screw threads 26 of lead screw 20 extend into the expanded rear aperture 25. Securing lead screw 20 in position at expanded rear aperture 25 is a rear bearing 24, placed between two washers 30, held in contact with base segment 12 within expanded rear aperture 25 by a threaded nut 36 placed on the lead screw threads 26 (FIGS. 4 and 7). When nut 36 is threaded onto lead screw threads 26, lead screw 20 is prevented from moving along its longitudinal axis. However, front and rear bearings 32, 34 allow lead screw 20 to rotate around its longitudinal axis despite its constraint in lead screw aperture 22 by lead screw head 28 at one end and nut 36 at the other.

Rotation of lead screw 20 is facilitated by the hexagonal shape of lead screw head 28. A wrench or similar device may be placed on lead screw head 28 to rotate lead screw 20. As lead screw 20 rotates, the interaction of lead screw threads 26 with threaded drive block aperture 42 causes drive block 40 to move along lead screw 20 within drive block slot 18. Depending on the direction of rotation of lead screw 20, drive block 40 will move either forward or backward within drive block slot 18 until it comes in contact with either the front or rear end of drive block 18.

Extending upward from the top of base segment 12, from upper surface 15, is a top segment mounting structure 24. Top segment mounting structure 24 begins inward of the outside edges of base segment 12 and extends upward in an outwardly flaring fashion to form an elongated "dove-tail" structure (FIGS. 4, 5 and 7). Top segment mounting structure 24 is symmetrically located along the radial axis of base segment 12 and is of sufficient width to allow mounting apertures 14a,b and drive slot 18 to extend through it into base segment 12.

A top segment 46 is provided. Along the bottom side of top segment 46 is top segment receiving structure 48 which is formed in reverse configuration to top segment mounting structure 24 (FIG. 7). Thus top segment receiving structure 48 and top segment mounting structure 24 mate to form a guide and a restraint for the movement of top segment 46 along upper surface 15 of base segment 12 (FIGS. 4 and 5). A drive block channel 49, slightly larger in width than drive block 40, extends along the entire length of top segment 46. The height of drive block channel 49 is determined so that the top of drive block 40 will not contact the top of drive block channel 49 when top segment 46 rests on upper surface 15 and top segment mounting structure 24 is mated with top segment receiving structure 48 (FIGS. 4 and 5).

To mate top segment receiving structure 48 and top segment mounting structure 24, top segment 46 is aligned with the upper surface 15 of base segment 12 and top segment mounting structure 24 is further aligned with the corresponding top jaw receiving structure 48. Top segment 46 is then slid along upper surface 15, passing drive block 40 through the unobstructed drive block channel 49 and top segment mounting structure 24 into mating contact with top segment receiving structure 48.

Figure 1:
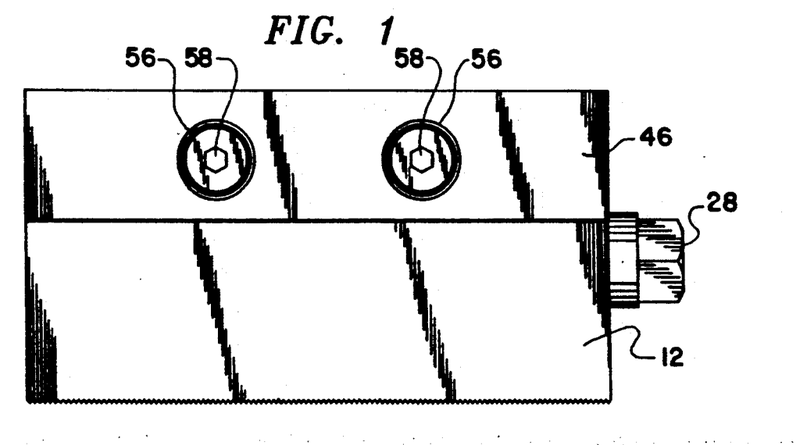
FIG. 1 is a left elevational view of the invention.
Figure 2:
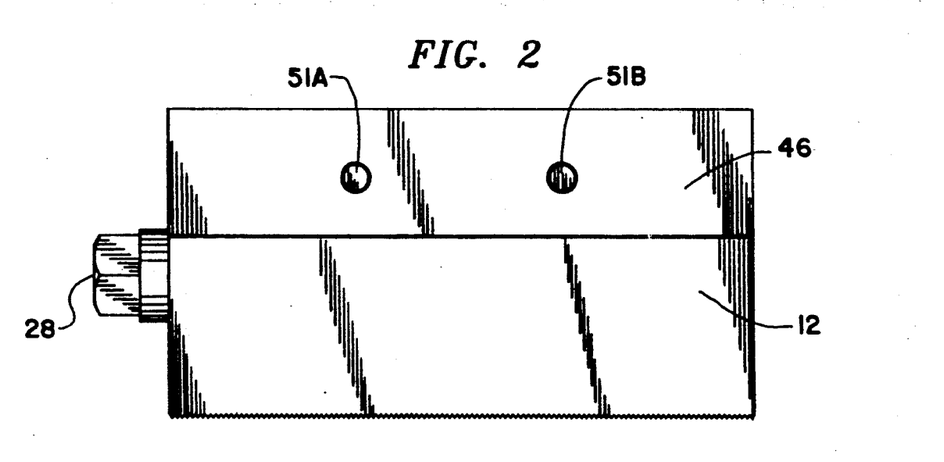
FIG. 2 is a right elevational view of the invention of FIG. 1.

Drive pin apertures 47 (FIG. 7) extend through top segment 46 and drive block channel 49 at a right angle to drive block channel 49. Drive pin apertures 47 exit one side of top segment 46 through expanded drive pin receiving apertures 50a,b (FIGS. 1 and 7). On the opposite side of top segment 46, drive pin apertures 47 exit top segment 46 through threaded drive pin receiving apertures 51a,b (FIG. 2). Because drive block 40, located within drive block slot 18, is located at the end of base segment 12 and because top segment 46 may be removed, rotated 180 degrees, and re-attached to base segment 12, two drive pin apertures 47 are provided to allow one of drive pin apertures 47 to be aligned with smooth block aperture 44 in drive block 40 regardless of which end of top segment 46 is placed rearward.

Drive pins 52 are provided having drive pin threads 54 on one end and drive pin heads 56 on the other. Drive pin head 56 preferably has a knurled outer surface to facilitate manual threading of drive pin threads 54 with threaded drive pin receiving apertures 51a or b. In addition, a hexagonal aperture 58 extends into drive pin head 56 so that drive pin 52 may be tightly threaded into threaded drive pin receiving apertures 51a, b by an Allen wrench or similar device inserted into hexagonal apertures 58. The expanded drive pin receiving apertures 50a, b are sized to receive drive pin head 56 of drive pin 52 so that drive pin head 56 will be somewhat recessed into expanded drive pin receiving apertures 50a, b.

When top segment 46 is engaged with base segment 12 through the interaction of top segment mounting structure 24 and top segment receiving structure 48, one of the drive pin apertures 47 may be aligned with smooth drive block aperture 44. Then, a drive pin 52 may be passed through drive pin receiving aperture 50a or b, smooth drive block aperture 44 in drive block 40 (now located within drive block channel 49) and into engagement with threaded drive pin receiving apertures 51a or b. Drive pin 52 is then rotated by the manipulation of drive pin head 56 so that drive pin threads 54 engaged threaded derive pin receiving aperture 51a or b. Drive pin 52 is thereby secured within drive pin aperture 47 by the interaction between drive pin threads 54 and threaded drive pin receiving apertures 51a or b.

As drive block 40 is moved through the turning of lead screw 20 as described above, its motion is imparted to top segment 46 through drive pin 52 which passes through smooth drive block aperture 44.

Top segment 46 may be configured by machining or attachment of a work piece holder to hold a variety of work pieces. One end of top segment 46 may be configured to hold one type of work piece while the opposite end may be configured to hold a different type. Alternatively, a plurality of top segments 46 may be produced having specific work piece holding configurations.

When it is desired to switch from one work piece engaging configuration to another, the top segment 46 may be removed from its contact with base segment 12 by removing drive pin 52 from the respective drive pin aperture 47 and then sliding top segment 46 along upper surface 15 of base segment 12 until top segment mounting structure 24 is free from its engagement with top segment receiving structure 48. At this time, top segment 46 may be rotated 180 degrees thereby presenting a new work piece holding configuration or a new top segment 46 with its respective work piece configurations may be presented. Thereafter, top segment receiving structure 48 may be aligned with top segment mounting structure 24 and top segment 46 slid along upper surface 15 of base segment 12 until the drive pin aperture 47 is aligned with smooth drive block aperture 44 of drive block 40. Drive pin 52 is inserted through the drive pin aperture 47, through smooth drive block aperture 44, and into threading engagement with threaded drive pin receiving apertures 50a, b.

The relatively minor process of removing the top segment 46 and then either rotating the top segment 46 by 180 degrees, or entirely replacing one top segment 46 with another of similar structure having a different work piece engaging configuration makes top jaw 10 easily and readily adaptable to a variety of applications. In this way, a plurality of work piece receiving configurations are readily accessible without having to remove the entire top jaw 10 from the master jaw 4. The simplicity of providing a variety of readily accessible work piece engaging top segments 46 substantially reduces the time presently required to configure top jaws for specific work pieces.

Figure 8:
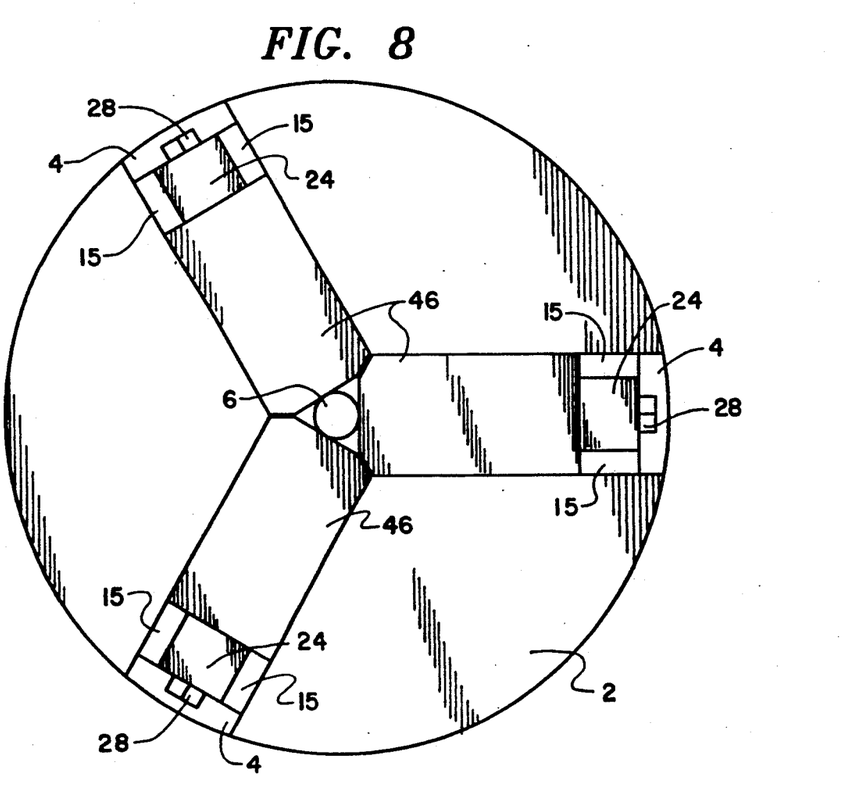
FIG. 8 is a top view of three of the novel top jaws attached to master jaws on a chuck around a work piece.

FIG. 8 shows three top jaws 10 attached to master jaws 4 on a chuck 2 in clamping position around a work piece 9. Although three top jaws 10 are shown, a greater or lesser number of top jaws 10 may be attached to chuck 2 above master jaws 4 extending radially from the center of chuck 2. As can be seen, the top jaws 10 may have each of their individual top segments 46 movable along the radial axis of the respective top jaw 10. Because of the individual adjustment of each top jaw, non-concentric work pieces may easily be held in position upon the chuck 2 by appropriate positioning of the respective top segments 46.

This positioning occurs in two steps, the first providing rough positioning and the second fine. The first positioning step occurs when base segment 12 is positioned above master jaw 4 by placing the serrations 16 of base segment 12 into contact with the serrations (not shown) in master jaw 4 as described above. This positioning locates base segment 12 above master jaw 4 to a tolerance of the width of the serrations 16. Base segment 12 is then mounted to master jaw 4 by mounting screws as described above. Fine positioning and clamping occurs after top segment 46 is placed in mating contact with base segment 12 and lead screw 20 rotated, thereby moving drive block 40, and consequently top segment 46 along the radial axis of the top jaw 10 as explained above.

An additional advantage of the instant top jaw 10, besides precise positioning, is that the rotation of lead screw 20, when the top jaw 10 is placed in functional condition, causes top segment 46 to move along the radial axis of the top jaw 10, thereby providing a clamping action on work piece 9. This clamping action is particularly useful in securely holding non-concentric or odd shaped work pieces. This clamping action has been heretofore unavailable with the prior art top jaws.

It should be noted that the top segments 46 are adjustable toward the center and toward the edge of the chuck 2 along radials extending from the center of the chuck 2. Although inward movement of the top segments 46, particularly when configured with specific work piece holding adapters, can apply clamping pressure to a work piece located in the area of convergence of the top segments 46, a top segment 46 with a specially adapted work piece holding feature can also hold a work piece by outward movement of the top segments 46. For example, the top segments 46 may contain work piece holding adapters which are curved to fit on the inside bore of a pipe shaped work piece. Moving the top segments 46 outward would move this curved work piece holder into contact with the inside surface of the pipe. Movement of all three top jaws outwardly would thereby provide an outwardly directed clamping force on the interior of such pipe thereby securely holding the pipe in position above the chuck 2.

The instant invention has been described in connection with a specific embodiment. The description given is the best mode of the invention currently contemplated by the inventor. However, the description given herein is merely exemplary and not intended for limitation. It is realized that changes and modifications may be made to the description given herein and still be within the scope of the invention as claimed. Further, obvious changes and modifications will occur to one skilled in the art.

What is claimed is:

1. An adjustable top jaw, which top jaw is attachable to a master jaw which is in turn attached to a chuck of a lathe or similar machine along a radial extending from the center of said chuck, said top jaw comprising:
 (a) a base segment having a base mountable on said master jaw, said base segment aligned with a radial directed outward from the center of said chuck, said base segment having:
   (1) a lead screw aperture extending entirely through said base segment, said lead screw aperture aligned with said radial;
   (2) a drive block slot extending downward from the top of said base segment into said base segment, said drive block slot extending into said base segment a distance below said lead screw aperture;
 (b) means for removably mounting said base segment to said master jaw;
 (c) a drive block located within said drive block slot, said drive block having a first aperture extending therethrough colinearly with said lead screw aperture, said first aperture being threaded, said drive block extending upward from said drive block slot above said base segment, said drive block having a second aperture, said second aperture extending through said drive block above and perpendicular to said first aperture;
 (d) a lead screw having a threaded end, said threaded end having threads corresponding to said threads of said first aperture of said drive block, said lead screw located within said lead screw aperture, said threaded end of said lead screw threadingly extending through said first aperture of said drive block, said lead screw having a head opposite said threaded end, said lead screw rotatable about its longitudinal axis within said lead screw aperture, said lead screw constrained within said lead screw aperture by means for constraining said lead screw within said lead screw aperture;
 (e) a top segment attachable to said base segment, said top segment having a drive block channel for receiving the part of said drive block extending upward from said drive block slot, said drive block channel having a width slightly larger than said drive block and a length somewhat longer than said drive block whereby, when said top segment is mounted on said base segment, said part of said drive block extending upward from said drive block slot is contained within said drive block channel;
 (f) means for slidably attaching said top segment to said base segment; and,
 (g) means for attaching said top segment to said drive block;

whereby the rotation of said lead screw causes said drive block to move forward or backward in said drive block slot according to the direction of rotation of said lead screw thereby moving said top segment forward and backward in accordance with the movement of said drive block due to the interaction of said means for attaching said top segment to said drive block thereby moving said top segment into clamping arrangement with a work piece.

2. The adjustable top jaw of claim 1 wherein said base segment further comprises a plurality of parallel serrations extending across said base of said base segment whereby said serrations may contact corresponding serrations on said master jaw when said base segment is mounted on said master jaw thereby constraining said base segment in motion relative to said master jaw along said radial directed outward from the center of said chuck.

3. The top jaw of claim 2 wherein said serrations are right-triangular in shape.

4. The top jaw of claim 1 wherein said means for mounting said base segment to said master jaw comprises threaded mounting screws having expanded heads, said mounting screws extending vertically through vertical mounting apertures in said base segment, said mounting apertures having reduced diameters at their ends closest to said base, said mounting screws threaded into means for connecting said mounting screws to said master jaw whereby rotating said mounting screws placed through said mounting apertures and into said means for connecting said mounting screws to said master jaw brings said heads of said mounting screws into contact with said reduced diameter of said mounting aperture thereby bringing said base segment into secure contact with said master jaw.

5. The top jaw of claim 1 wherein said lead screw further comprises means for facilitating rotation of said lead screw about its longitudinal axis.

6. The top jaw of claim 5 wherein said means for facilitating rotation comprises surfaces on said head of said lead screw, said surfaces adapted to receive a wrench whereby rotation of a wrench placed on said head rotates said lead screw.

7. The top jaw of claim 1 wherein said means for constraining said lead screw comprises a nut placed in threaded contact with said threaded end of said lead screw whereby said nut interacts with said base segment to prevent movement of said lead screw along the radial axis of said base segment, said top jaw further comprising a first and second bearing means, each said bearing means located concentric with said lead screw, said first bearing means located between said head of said lead screw and said base segment, and said second bearing means located between said base segment and said nut threaded onto the threaded end of said lead screw, said first and second bearing means allowing said lead screw to rotate within said lead screw aperture.

8. The top jaw of claim 1 wherein said means for slidably attaching said top segment to said base segment comprises a protrusion extending upward from the upper surface of said base segment and a correspondingly shaped groove in said top segment whereby said protrusion is aligned with said correspondingly shaped groove in said top segment and said top segment is slid into mating contact with said protrusion of said base segment.

9. The top jaw of claim 8 wherein said protrusion extends upward from said upper surface of said base segment in an upward and outwardly flaring fashion to form a "dove-tail" configuration and wherein said groove in said top segment is correspondingly shaped.

10. The top jaw of claim 1 wherein said means for attaching said top segment to said drive block comprises a drive pin extending through a drive pin aperture in said top segment, said drive pin aperture located perpendicular to the radial axis of said top segment, said drive pin aperture extending first through a first side of said top segment, through said second aperture of said drive block, and then into a second opposite side of said top segment, whereby movement of said drive block moves said drive pin which in turn moves said top segment.

11. The top jaw of claim 10 wherein said drive pin is threaded on one end and said drive pin aperture in said second side of said top segment is correspondingly threaded so as to secure said drive pin within said drive pin aperture.

12. The top jaw of claim 11 wherein said drive pin has means for facilitating threaded engagement with said threads in said second side of said drive pin aperture.

13. The top jaw of claim 12 wherein said means for facilitating rotation comprises a knurled head.

14. The top jaw of claim 12 wherein said means for facilitating rotation comprises an indentation in the non-threaded end of said drive pin, said indentation adapted to receive a tool whereby rotation of said tool inserted into said indentation rotates said drive pin.

15. An adjustable top jaw, which top jaw is attachable to a master jaw which is in turn attached to a chuck of a lathe or similar machine along a radial extending from the center of said chuck, said top jaw comprising:
  (a) a base segment having a base mountable on said master jaw, said base segment aligned with a radial directed outward from the center of said chuck, said base segment having:
    (1) a lead screw aperture extending entirely through said base segment, said lead screw aperture aligned with said radial;
    (2) a drive block slot extending downward from the top of said base segment into said base segment, said drive block extending into said base segment a distance below said lead screw aperture;
    (3) a plurality of parallel serrations extending across said base of said base segment whereby said serrations may contact corresponding serrations on said master jaw when said base segment is mounted on said master jaw thereby constraining said base segment in motion relative to said master jaw along said radial directed outward from the center of said chuck;
  (b) means for removably mounting said base segment to said master jaw comprising threaded mounting screws having expanded heads, said mounting screws having expanded heads, said mounting screws vertically extending through vertical mounting apertures in said base segment, said mounting apertures having reduced diameters at their ends closest to said master jaw, said mounting screws threaded into means for connecting said mounting screws threaded into means for connecting said mounting screws to said master jaw whereby rotating said mounting screws placed through said mounting apertures and into said means for connecting said mounting screws to said master jaw brings said heads of said mounting screws into contact with said reduced diameter of said mounting aperture thereby bringing said base segment into secure contact with said master jaw;

(c) a drive block located within said drive block slot, said drive block having a first aperture extending therethrough colinearly with said lead screw aperture, said first aperture being threaded, said drive block extending upward from said drive block slot above said base segment, said drive block having a second aperture, said second aperture extending through said drive block above and perpendicular to said first aperture;

(d) a lead screw having a threaded end, said threaded end having threads corresponding to said threads of said first aperture of said drive block, said lead screw located within said lead screw aperture, said threaded end of said lead screw threadingly extending through said first aperture of said drive block, said lead screw having a head opposite said threaded end, said lead screw rotatable about its longitudinal axis within said lead screw aperture, said lead screw constrained within said lead screw aperture by a nut placed in threaded contact with said threaded end of said lead screw whereby said nut interacts with said base segment to prevent movement of said lead screw along the radial axis of said base segment;

(e) first and second bearing means, each said bearing means concentrically located with said lead screw, said first bearing means location between said head of said lead screw and said base segment, and said second bearing means located between said base segment and said nut threaded onto the threaded end of said lead screw, said first and second bearing means allowing said lead screw to rotate within said lead screw aperture;

(f) means for facilitating rotation of said lead screw about its longitudinal axis comprising surfaces on said head of said lead screw, said surfaces adapted to receive a wrench whereby rotation of a wrench placed on said head rotates said lead screw;

(g) a top segment attachable to said base segment, said top segment having a drive block channel for receiving the part of said drive block extending upward from said drive block slot, said drive block channel having a width slightly larger than said drive block and a length somewhat longer than said drive block whereby, when said top segment is mounted on said base segment, said part of said drive block extending upward from said drive block slot is contained within said drive block channel;

(h) means for slidably attaching said top segment to said base segment comprising a protrusion extending upward from the upper surface of said base segment and a correspondingly shaped groove in said top segment whereby said protrusion is aligned with said correspondingly shaped groove in said top segment and said top segment is slid into mating contact with said protrusion of said base segment; and, (i) means for attaching said top segment to said drive block comprising a drive pin extending through a drive pin aperture in said top segment, said drive pin aperture located perpendicular to the radial axis of said top segment, said drive pin aperture extending first through a first side of said top segment, through said second aperture of said drive block, and then into a second opposite side of said top segment, whereby movement of said drive block moves said drive pin which in turn moves said top segment;

whereby the rotation of said lead screw causes said drive block to move forward or backward in said drive block slot according to the direction of rotation of said lead screw thereby moving said top segment forward and backward in accordance with the movement of said drive block due to the interaction of said means for attaching said top segment to said drive block thereby moving said top segment into clamping arrangement with a work piece.

16. An adjustable top jaw, which top jaw is attachable to a master jaw which is in turn attached to a chuck of a lathe or similar machine along a radial extending from the center of said chuck, said top jaw comprising:

(a) a base segment having a base mountable on said master jaw, said base segment aligned with a radial directed outward from the center of said chuck, said base segment having:
  (1) a lead screw aperture extending entirely through said base segment, said lead screw aperture aligned with said radial;
  (2) a drive block slot extending downward from the top of said base segment into said base segment, said drive block slot extending into said base segment a distance below said lead screw aperture;
  (3) a plurality of right-triangular shaped parallel serrations extending across said base of said base segment whereby said serrations may contact corresponding serrations on said master jaw when said base segment is mounted on said master jaw thereby constraining said base segment in motion relative to said master jaw along said radial directed outward from the center of said chuck;

(b) means for removably mounting said base segment to said master jaw comprising threaded mounting screws having expanded heads, said mounting screws vertically extending through vertical mounting apertures, said mounting apertures having reduced diameters at their ends closest to said base, said mounting screws threaded into nuts constrained within channels in said master jaw whereby rotating said mounting screws placed through said mounting apertures and into said nuts brings said heads of said mounting screws into contact with said reduced diameter of said mounting aperture thereby bringing said base segment into secure contact with said master jaw;

(c) a drive block located within said drive block slot, said drive block having a first aperture extending therethrough colinearly with said lead screw aperture, said first aperture being threaded, said drive block extending upward from said drive block slot above said base segment, said drive block having a second aperture, said second aperture extending through said drive block above and perpendicular to said first aperture;

(d) a lead screw having a threaded end, said threaded end having threads corresponding to said threads of said first aperture of said drive block, said lead screw located within said lead screw aperture, said threaded end of said lead screw threadingly extending through said first aperture of said drive block, said lead screw having a head opposite said threaded end, said lead screw rotatable about its longitudinal axis within said lead screw aperture, said lead screw constrained within said lead screw aperture by a nut placed in threaded contact with said threaded end of said lead screw whereby said nut interacts with said base segment to prevent movement of said lead screw along the radial axis of said base segment;

(e) first and second bearing means, each said bearing means concentrically located with said lead screw, said first bearing means location between said head of said lead screw and said base segment, and said second bearing means located between said base segment and said nut threaded onto the threaded end of said lead screw, said first and second bearing means allowing said lead screw to rotate within said lead screw aperture;

(f) means for facilitating rotation of said lead screw about its longitudinal axis comprising surfaces on said head of said lead screw, said surfaces adapted to receive a wrench whereby rotation of a wrench placed on said head rotates said lead screw;

(g) a top segment attachable to said base segment, said top segment having a drive block channel for receiving the part of said drive block extending upward from said drive block slot, said drive block channel having a width slightly larger than said drive block and a length somewhat longer than said drive block whereby, when said top segment is mounted on said base segment, said part of said drive block extending upward from said drive block slot is contained within said drive block channel;

(h) means for slidably attaching said top segment to said base segment comprising a protrusion extending upward from the upper surface of said base segment and a correspondingly shaped groove in said top segment whereby said protrusion is aligned with said correspondingly shaped groove in said top segment and said top segment is slid into mating contact with said protrusion of said base segment, said protrusion extending upward from said upper surface of said base segment in an upward and outwardly flaring fashion to form a "dove-tail" configuration and wherein said groove in said top segment is correspondingly shaped; and, (i) means for attaching said top segment to said drive block comprising a drive pin extending through a drive pin aperture in said top segment, said drive pin aperture located perpendicular to the radial axis of said top segment, said drive pin aperture extending first through a first side of said top segment, through said second aperture of said drive block, and then into a second opposite side of said top segment, said drive pin being threaded on one end and said drive pin aperture in said second side of said top segment being correspondingly threaded so as to secure said drive pin within said drive pin aperture, said drive pin having means for facilitating threaded engagement with said threads in said second side of said drive pin aperture comprising a knurled head, said knurled head including an indentation in said head adapted to receive a tool whereby rotation of said tool inserted into said indentation rotates said drive pin, whereby movement of said drive block moves said drive pin which in turn moves said top segment;

whereby the rotation of said lead screw causes said drive block to move forward or backward in said drive block slot according to the direction of rotation of said lead screw thereby moving said top segment forward and backward in accordance with the movement of said drive block due to the interaction of said means for attaching said top segment to said drive block thereby moving said top segment into clamping arrangement with a work piece.

* * * * *